(12) United States Patent
Agnihotri et al.

(10) Patent No.: US 8,199,991 B2
(45) Date of Patent: Jun. 12, 2012

(54) METHOD TO AUTOMATICALLY DECODE MICROARRAY IMAGES

(75) Inventors: Lalitha Agnihotri, Tarrytown, NY (US); James David Schaffer, Wappingers Falls, NY (US); Nevenka Dimitrova, Pelham Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 447 days.

(21) Appl. No.: 12/516,931

(22) PCT Filed: Dec. 3, 2007

(86) PCT No.: PCT/IB2007/054901
§ 371 (c)(1), (2), (4) Date: May 29, 2009

(87) PCT Pub. No.: WO2008/065634
PCT Pub. Date: Jun. 5, 2008

(65) Prior Publication Data
US 2010/0008554 A1 Jan. 14, 2010

Related U.S. Application Data (60) Provisional application No. 60/868,129, filed on Dec. 1, 2006, provisional application No. 60/941,706, filed on Jun. 4, 2007.

(51) Int. Cl.
*G06K 9/36* (2006.01)
(52) U.S. Cl. .................... 382/129; 382/199; 382/280
(58) Field of Classification Search .............. 382/192, 382/199, 216, 280, 296
See application file for complete search history.

(56) References Cited

U.S. PATENT DOCUMENTS
2003/0219150 A1  11/2003  Niles
(Continued)

FOREIGN PATENT DOCUMENTS
EP  1162572 A2  12/2001
(Continued)

OTHER PUBLICATIONS

Uehara, C. et al "Towards Automatic Analysis of DNA Microarrays" Applications of Computer Vision, 2002 pp. 57-62.
(Continued)

*Primary Examiner* — Wensing Kuo (57) ABSTRACT

A method of automatically identifying the microarray chip corners and probes, even if there are no probes at the corners, in a high density and high resolution microarray scanned image having an image space, wherein the method minimizes the error distortions in the image arising in the scanning process by applying to the image a multipass corner finding algorithm comprising: (a) applying a Radon transform to an input microarray image to project the image into an angle and distance space where it is possible to find the orientation of the straight lines; (b) applying a fast Fourier transform to the projected image of (a) to find the optimal tilting angle of the projected image; (c) determining the optimal first and last local maxima for the optimal tilting angle; (d) back projecting the determined first and last local maxima to the image space to find the first approximation of the first and last column lines of the image; (e) rotating the image and repeating steps (a) through (d) to find the first approximation of the top and bottom row lines of the image; (f) determining the first approximation of the four corners of the image from the intersection of the column and row lines; (g) applying a heuristic for determining if the first approximation of step (f) is sufficient; and (h) optionally trimming the scanned image around the first approximation of the four corners and repeating steps (a) through (f).

10 Claims, 8 Drawing Sheets

U.S. PATENT DOCUMENTS

2004/0001623 A1     1/2004    Ugolin
2006/0036373 A1     2/2006    Ghosh

FOREIGN PATENT DOCUMENTS

WO        0140842 A1     1/2001
WO        2005109316 A2    11/2005

OTHER PUBLICATIONS

Bajcsy, P. "An Overview of DNA Microarray Image Requirements for Automated Processing" Computer Vision and Pattern Recognition 2005.

Steinfath, M. et al "Automated Image Analysis for Array Hybridization Experiments" Bioinformatics, vol. 17, No. 7, Jul. 2001, pp. 634-641.

Brandles, Norbert et al "Robust DNA Microarray Image Analysis" Machine Vision and Applications, vol. 15, No. 1, Oct. 2003, pp. 11-28.

Bajcsy, P. "Gridline: Automatic Grid Alignment in DNA Microarray Scans" IEEE Transactions on Image Processing, vol. 13, No. 1, Jan. 2004, pp. 15-25.

Antoniol, G. et al "Microarray Image Addressing Based on the Radon Transform" IEEE 2005.

Ceccarelli, M. et al "A Deformable Grid-Matching Approach for Microarray Images" IEEE Transactions on Image Processing, vol. 15, No. 10, Oct. 2006, pp. 3178-3188.

Solanki, E. et al "Estimating and Undoing Rotation for Print-Scan Resilient Data Hiding".

```
Find_corners(image)
{
        findLines (image, x)
        findLines (image, y)
        estimate(x₁y₁, x₂y₂, x₃y₃, x₄y₄)

if (goodness_of_lines(x) < threshhold)
                findLines (image, west_edge)
                findLines (image, east_edge)
        if (goodness_of_lines(y) < threshhold)
                findLines (image, north _edge)
                findLines (image, south _edge)
        (re)estimate(x₁y₁, x₂y₂, x₃y₃, x₄y₄)
}
```

METHOD TO AUTOMATICALLY DECODE MICROARRAY IMAGES

CROSS REFERENCE TO RELATED CASES

Applicants claim the benefit of Provisional Application Ser. No. 60/868,129, filed Dec. 1, 2006.

This invention relates to a method of automatically determining the locations of the probes spots on a microarray image so the image data may be converted into measures of biological activity.

DNA microarray technology is very recent and rapidly evolving. At present, it is widely used in systematic studies of global gene expression programs, inferring gene function using microarrays, measuring gene copy number polymorphisms, and genome-wide DNA-protein interactions. Extraction of data from microarray images has many inherent problems: non-uniform hybridization results in uneven probe intensity and geometry; the placement of the chips into the scanner is not fixed which means the corners of the chip can be anywhere; scanners often distort the resulting images and this creates problems for converting these images into the needed data; fiducials can be placed in many different combinations as many different design patterns co-exist.

A DNA microarray consists of a solid surface onto which single-stranded DNA molecules have been chemically bonded. Microarrays are widely used to study gene expression in order to associate gene activities with biological processes and to group genes into networks of interconnected activities. They are very advantageous since they allow measuring the expression of thousands of genes in parallel and in a semi automated way. In functional genomics, there are different types of microarrays including gene expression arrays, single nucleotide polymorphism (SNP) arrays, gene promoter arrays, comparative genomic hybridization arrays, CpG island arrays—to just mention a few. For all of these types of arrays, the scanned image needs to be processed in order to recover the microarray data.

Representational oligonucleotide microarray analysis (ROMA) has been developed at Cold Spring Harbor Laboratory (CSHL) as an instance of a comparative genomic hybridization method [6]. This technology is a significant step forward in the resolution available for examining copy number polymorphisms (CNPs) in the human genome. By digesting a genome with an enzyme with a small (6 base pairs) recognition site, a large number of fragments more or less uniformly distributed across the genome will be produced. Within each fragment, a unique probe has been identified and deposited at one spot on the microarray. Chips with 85,000 probes are presently used and chips with about 400,000 probes are being tested. The DNA extracted from sample tissue cells is labeled and hybridized with the chip; intensity variations are proportional to copy numbers of the fragments in the samples. Using this methodology, one is able to identify variation between cancer and normal genomes, as well as between normal human genomes.

However, these high density chips present a challenge to available chip readers. Using stepper motors and laser scanners, the excited hybridized probes are converted into images, i.e. pixel arrays. The motor moves the scanner few microns at a time and a new row read out is obtained. This way a microarray chip is digitized at various resolutions of one, two, or five microns depending on the step size the motor takes. The array of probes within the image is translated and rotated by unknown amounts by the mechanical and optical operations of the scanner. In addition, there may be keystoning effect (i.e. the array becomes a trapezoid instead of a rectangle), and/or small sinusoidal perturbations in the probe locations (that is, instead of being on a straight line, the probes are actually aligned on a sinusoidal curve). What is needed for high throughput research with high density microarrays is software to automatically (i.e. without human intervention) identify the probe locations, whose intensities are to be converted into the probe intensities.

Currently, the probe patterns on the chips are being explored, but a maximum density is achieved with a checkerboard pattern. That is, half the chip area must be wasted because current image processing software is unable to adequately resolve the probes. If improved software can be produced, a doubling of information density on ROMA chips might be achieved.

In the literature there are other algorithms that attempt to perform automated microarray image analysis. Brandle et al. [reference 1] and Uehara and Kakadiaris [reference 6] both present approaches to the whole spectrum of functions needed to convert an image into the desired numerical values and both advocate the use of the Radon transform (below), but as far as we know and an approach to correcting a keystoning problem in microarray images has not yet been proposed. The software tool BioDiscovery Imagene 7.0 claims automated spot finding and grid placement even in a batch mode processing for multiple arrays, however, the algorithms are not public at the moment (http://www.biodiscovery.com/index/imagene-cgh). Khojasteh et al. [reference 2] propose an algorithm to automatically identify the regions of DNA copy number gain and loss from array CGH data through a multiscale edge detection algorithm [2].

Such problems are overcome by the disclosed herein a method that automatically identifies the corners and probes from a microarray scanned image. Test images are from ROMA microarray technology, but the method is general enough to work on other types of microarray images.

According to this invention a method is disclosed of automatically identifying the microarray chip corners and probes in a high density and high resolution microarray scanned image having an image space, wherein the method minimizes the error distortions in the image arising in the scanning process by applying to the image a multipass corner finding algorithm.

Specifically, it is an object of this invention to provide a method of automatically identifying the microarray chip corners and probes, even if there are no probes at the corners themselves, in a high density and high resolution microarray scanned image having an image space, wherein the method minimizes the error distortions in the image arising in the scanning process by applying to the image a multipass corner finding algorithm comprising:

applying a Radon transform to an input microarray image to project the image into an angle and distance space where it is possible to find the orientation of the straight lines;

applying a fast Fourier transform to the projected image of (a) to find the optimal tilting angle of the projected image;

determining the optimal first and last local maxima for the optimal tilting angle;

back projecting the determined first and last local maxima to the image space to find the first approximation of the first and last column lines of the image;

rotating the image and repeating steps (a) through (d) to find the first approximation of the top and bottom row lines of the image;

determining the first approximation of the four corners of the image from the intersection of the column and row lines;

applying a heuristic for determining if the first approximation of step (f) is sufficient; and optionally trimming the scanned image around the first approximation of the four corners and repeating steps (a) through (f).

Another object is to provide a method wherein the micro array scanned image is an image resulting from a member selected from the group consisting of representational oligonucleotide microarray analysis, gene expression arrays, single nucleotide polymorphism arrays, CgP island arrays, promoter microarrays and protein-DNA interaction arrays.

Another object is to provide a method wherein the error distortions in the image include keystoning effects.

Another object is to provide a method wherein the error distortions in the image include sinusoidal or curved probe location lines rather than straight location lines.

Another object is to provide a method wherein the resolution of the scanned image is 1, 2 or 5 micrometers.

Another object is to provide a method wherein the scanned image was scanned using Cy3 and Cy5 fluorophores.

Another object is to provide a method wherein the scanned image has resulted from a chip containing from about 85,000 probes to about 400,000 probes.

Another object is to provide a method further comprising of the method of claim 1 further comprising estimating the location of one or more probes.

Another object is to provide a method further comprising of the method of claim 1 further comprising processing the image in a subsampled or cropped manner.

Another object is to provide a method further comprising of the method of claim 1 further comprising converting the image data into measure of biological activity.

These and other aspects of the invention are explained in more detail with reference to the following embodiments and with reference to the figures.

The disclosure herein presents an automatic method for finding corners, as well as gridding or finding the interior probes, of microarray images which helps in decoding the images into numbers. We used image processing methods such as Radon transforms and fast Fourier transforms and several heuristics for finding the precise position of microarray corners and probes. Based on our technique we are able to identify the corners to within a few pixels, even for layout with no probes at the corners themselves.

Figure 1:
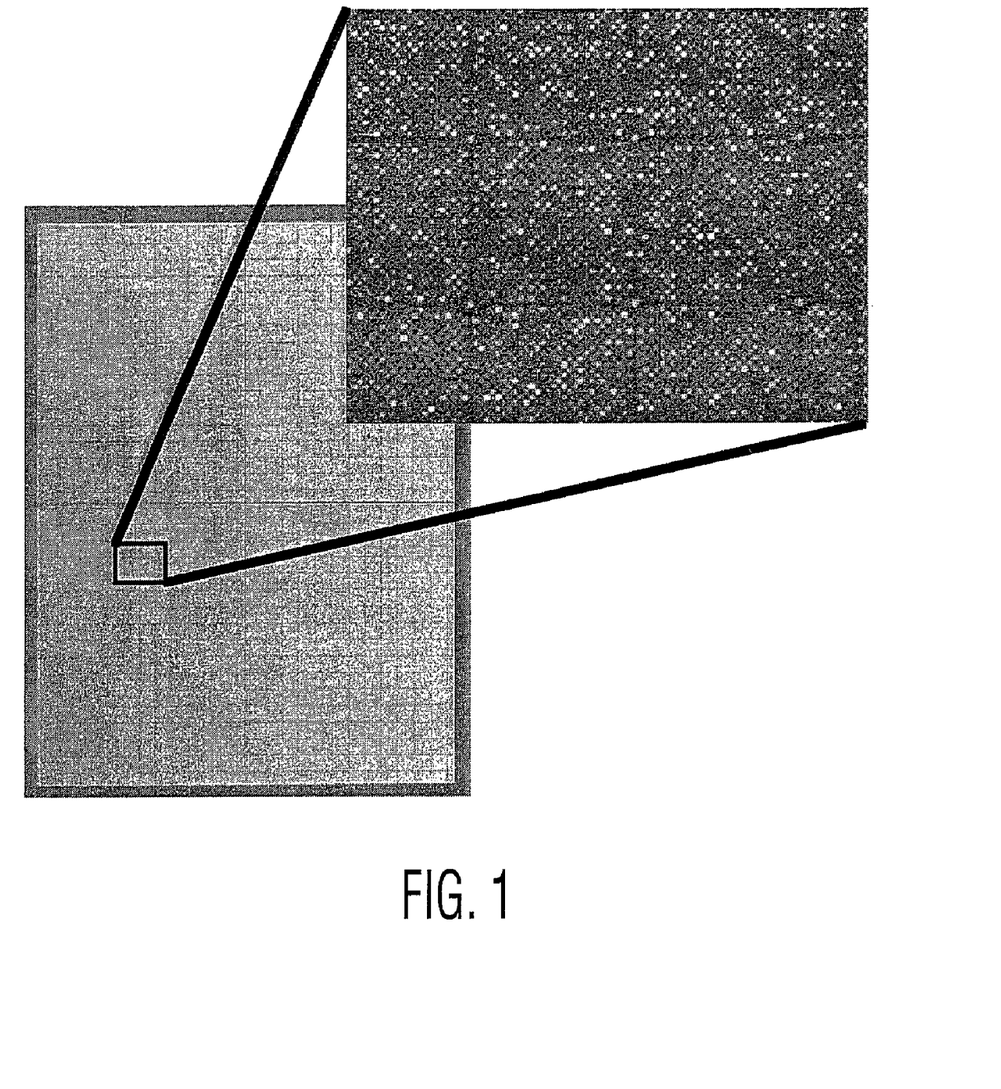
FIG. 1 is A ROMA image with 85,000 probes scanned at 2 μm resolution (image size is 150 MB)

An example of a high density microarray image (in our case ROMA image) is shown in FIG. 1. There are various probe design placement methods. The probes examined to date are squares with sides of 16 μm with 2 μm alleys between them. The images may be scanned with 5 μm, 2 μm, or 1 μm, or even smaller than micrometer resolution are contemplated yielding images with 3, 8, or 16 pixels per probe and zero, one or two pixels per alley.

According to the methodology disclosed herein, heuristics can be used for high density chips (i.e., 85,000-400,000 probes) by: 1) subsampling the image in the horizontal and vertical direction (e.g. taking every second pixel or every fourth pixel). Also, we can take part of top left quarter image—and part of top right quarter of the image, part of bottom left and bottom right in order to make a reasonable image size to start with the first approximation. This can also be based on the printing pattern and fiducial marks.

In addition, the chips are printed with a variety of fiducial mark patterns (visible as very bright probes). Every image is scanned in two color frequencies (usually the Cy3 and Cy5 fluorophores). The best image processing results for the corners-finding algorithm are expected from analyzing the total intensity images, i.e. the sum of the two color frequencies. Automatic microarray image decoding is needed to find the corner points, to perform gridding and decoding into microarray data. In this process intelligent image processing algorithms are needed to rectify the artifacts produced by the chemical reactions (i.e. normalization) and by the scanning process.

The goal of the software developed and described below was to automatically locate the four corners of the probe array in pixel coordinates. With this information, a bilinear transformation can be used to locate the probe centroids assuming no sinusoidal perturbations. The ROMA technology for high density arrays is a new approach and no adequate methods currently exist for processing these images.

Figure 2:
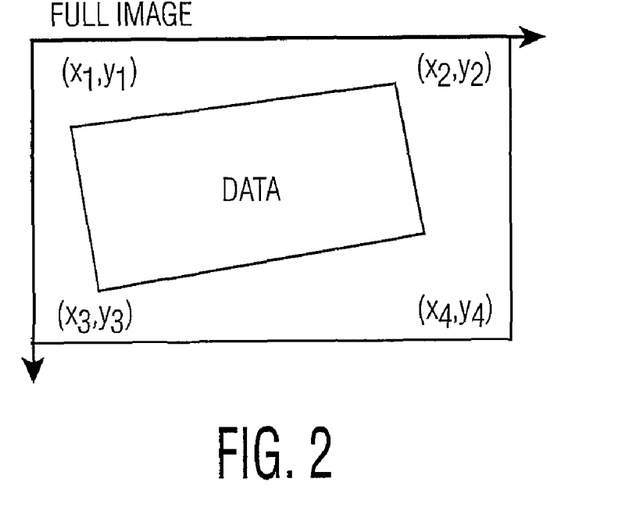
FIG. 2 is the image axis system of the program

Finding the corner points in a microarray image is the first step needed to perform gridding to find the position of the probes on the image and decoding into microarray data. The imaging process introduces artifacts and skews the image. It is important to detect and compensate for the artifacts produced by the scanning process. We designed a multipass algorithm to detect corner points in a high-resolution and high-density microarray image. The algorithm consists of an outer and an inner loop. The outer loop makes a first pass at finding the corners which will be accurate, provided there is no keystoning (i.e. the probe array is still a rectangle). A goodness-of-fit metric is computed and if satisfactory the algorithm will report its results and halt. If this test fails, an inner loop is executed that attempts to correct for the keystoning. Again the goodness-of-fit metric is computed and if acceptable, the results are reported, otherwise the algorithm reports a failure and halts. The results consist of the x and y coordinates of the corners of the probe array in pixels as shown in FIG. 2.

The algorithm makes use of the Radon transform [5]. One might think of the Radon transform as analogous to viewing an orchard from different angles. When one views at just the right angle, all the trees and the alleys between the rows will be clearly visible. If the pixels in the image are summed at this angle, a clear and regular oscillation of intensity will result (see FIGS. 7 & 8). A Fourier transform [4] of the Radon transform is computed and a heuristic criterion is used to identify the optimal angle.

Figure 3:
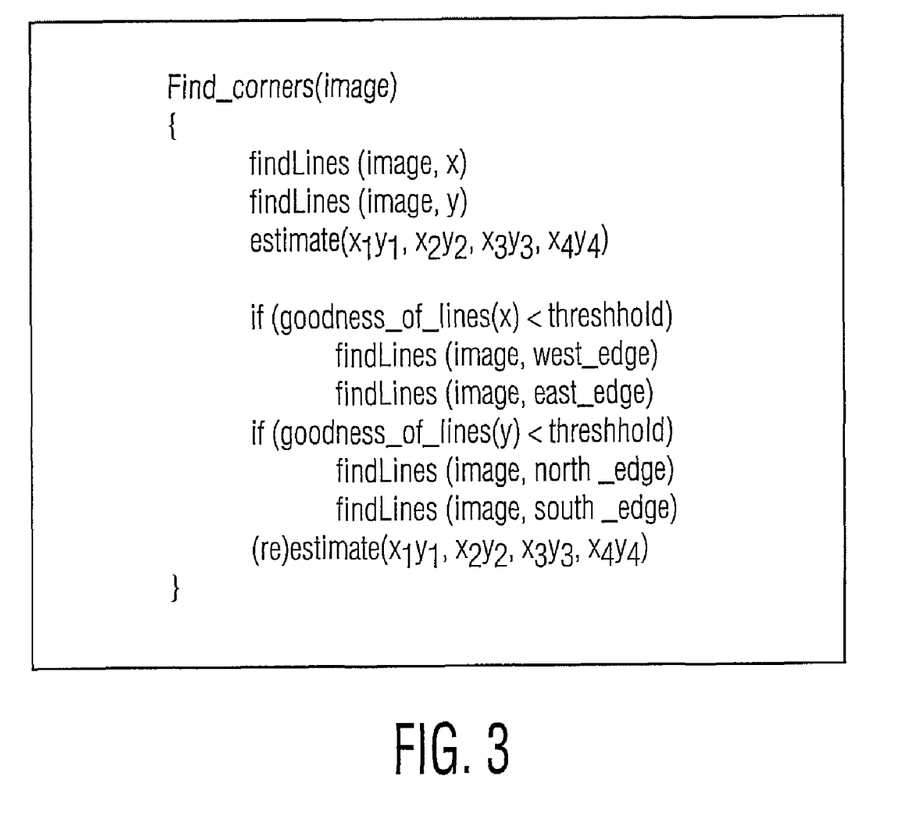
FIG. 3 is the Pseudocode for the Find corners (image) algorithm.

This heuristic is applied to obtain the best angle of rotation in the horizontal and vertical directions. Having selected the optimum rotation angle, the edges of the probe array are identified by selecting the first and last local maxima in the Radon transform for that angle. This operation is performed first on the whole image. Then if a goodness-of-fit measure indicates that the image is keystoned, the entire process is repeated either in the horizontal and/or in the vertical direction with subimages cropped to examine only the non-parallel edges. Pseudo code for the algorithm is shown in FIG. 3.

The algorithm for finding lines (findLines) along the extreme right and left edges of the image is as follows:

We apply the Radon transform to the input microarray image. The Radon transform projects the image into polar coordinate space, i.e., an angle and distance space ($\theta$ and $\rho$) where it is possible to find the orientation of the straight lines.

$$g(\rho, \theta) = \int_{-\infty}^{\infty} \int_{-\infty}^{\infty} g(x, y)\delta(\rho - x\cos\theta - y\sin\theta)dx\,dy$$

where g(x,y) is the original image as an array of intensities in the Cartesian coordinates, $g(\rho,\theta)$ is the Radon transformed image, $\theta$ is the rotation angle and $\rho$ is the smallest distance to the origin of the axis system, and $\delta( )$ is the Dirac delta function.

Figure 5:
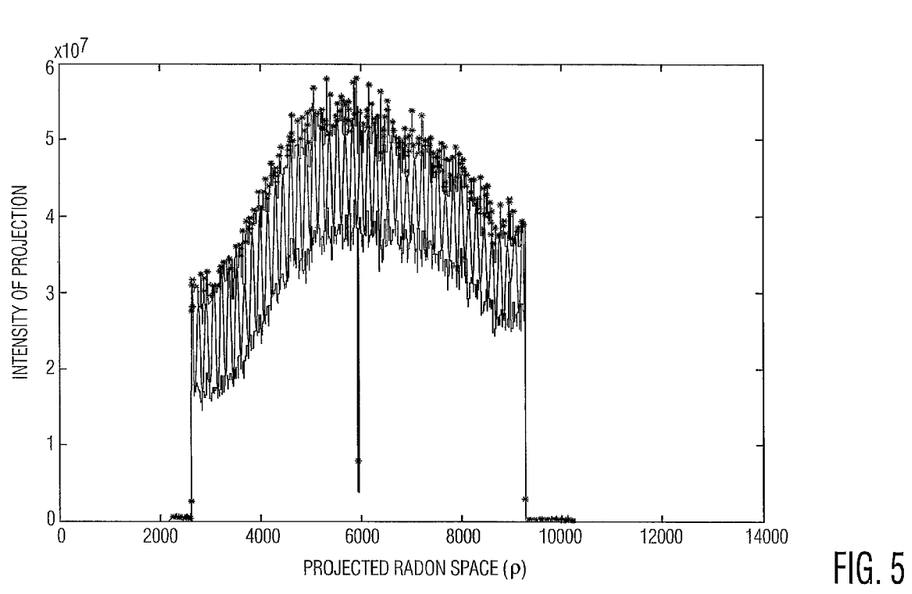
FIG. 5 is a sample Radon transform for a best angle.

To minimize computational effort, the algorithm performs a hierarchical Radon transform beginning by varying $\theta$ from −1 to +1 degrees in steps of 0.1 degree. Our experience with images from one scanner indicates that this range is adequate for this scanner. Another scanner with more rotational variability may require extending this range. The Radon transform is progressively applied for all $\theta \in \{-1, -0.9, -0.8, \ldots, 1\}$. FIG. 5 shows a sample projection of Radon transform for a particular $\theta$.

Figure 6:
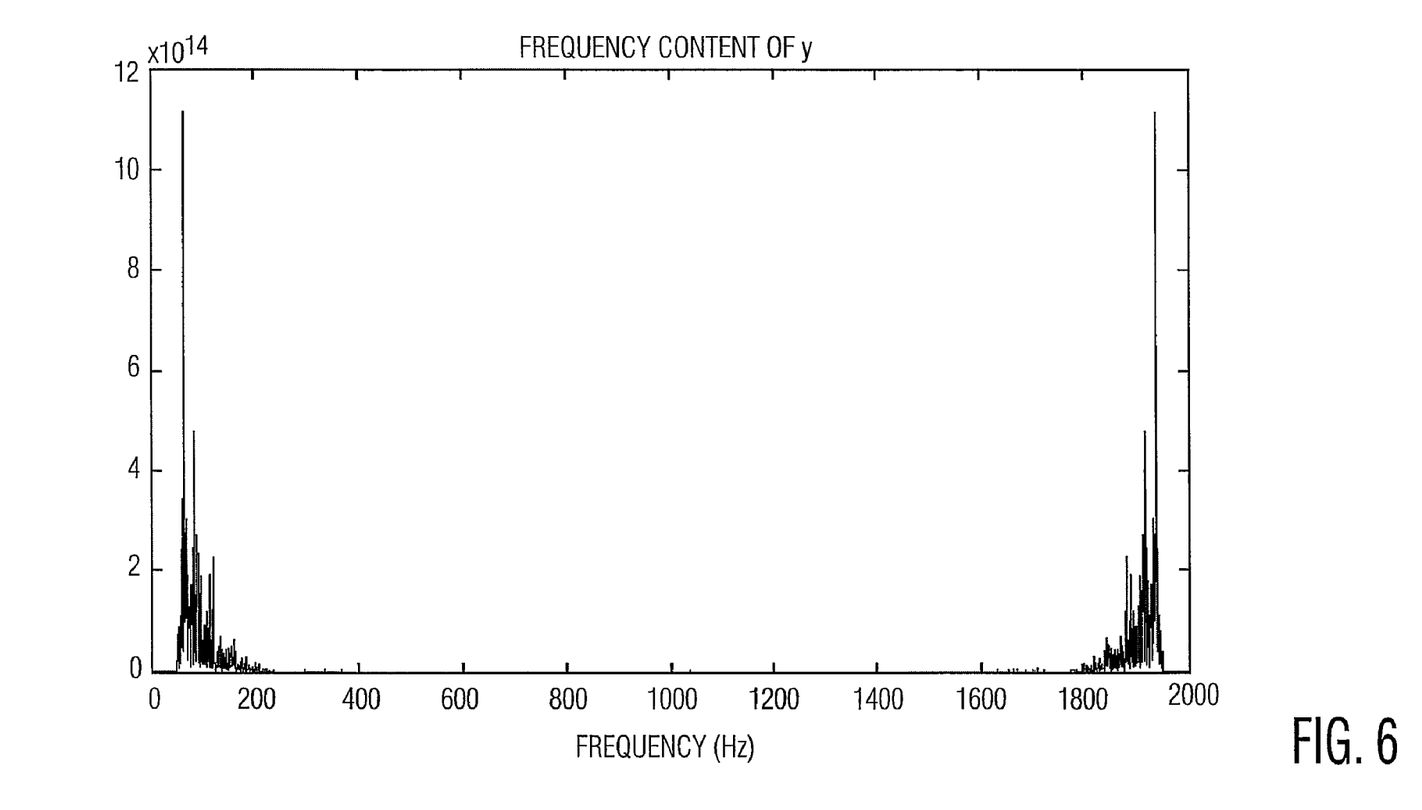
FIG. 6 is a sample FFT of the image projection.

We apply a fast Fourier transform to each of the $\theta$-curves in order to find the tilting angle of the image. The tilting angle $\theta_k$ selected is the one whose FFT contains the highest energy in a single frequency. FIG. 6 shows the FFT of the projection in FIG. 5.

We pick $\theta_k$ and apply Radon transform from $\theta_k-0.1$ to $\theta_k+0.1$ with a step size of 0.01 this time and go to step 3. Again, these parameter choices may have to be altered for different scanner-image sets. For each application of the Radon transform of a particular value of $\theta$ we obtain a vertical projection of the image onto the $\rho$ space. For each theta $(\theta_1, \ldots, \theta_{21})$ we obtain a separate curve from which one is chosen that has the highest energy in a single frequency in its fast Fourier transform to be the best angle of rotation.

Figure 7:
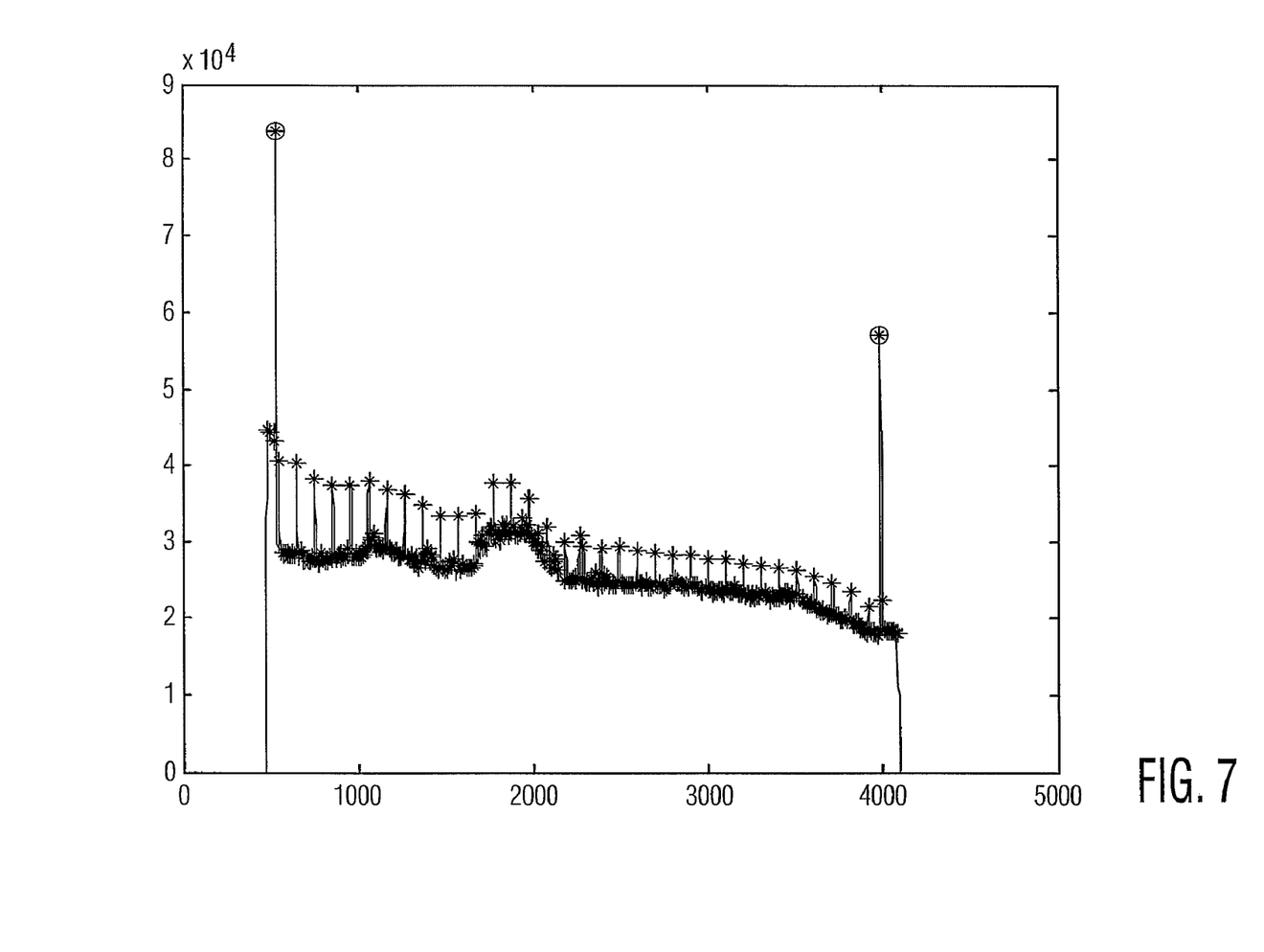
FIG. 7 is an example of Radon Transform for an Image that has Fiducials.

We find the local maxima of the Radon transform of the best angle. FIG. 7 below shows the Radon transform for the angle that has highest energy in a single frequency. The stars denote the local maxima.

Figure 8:
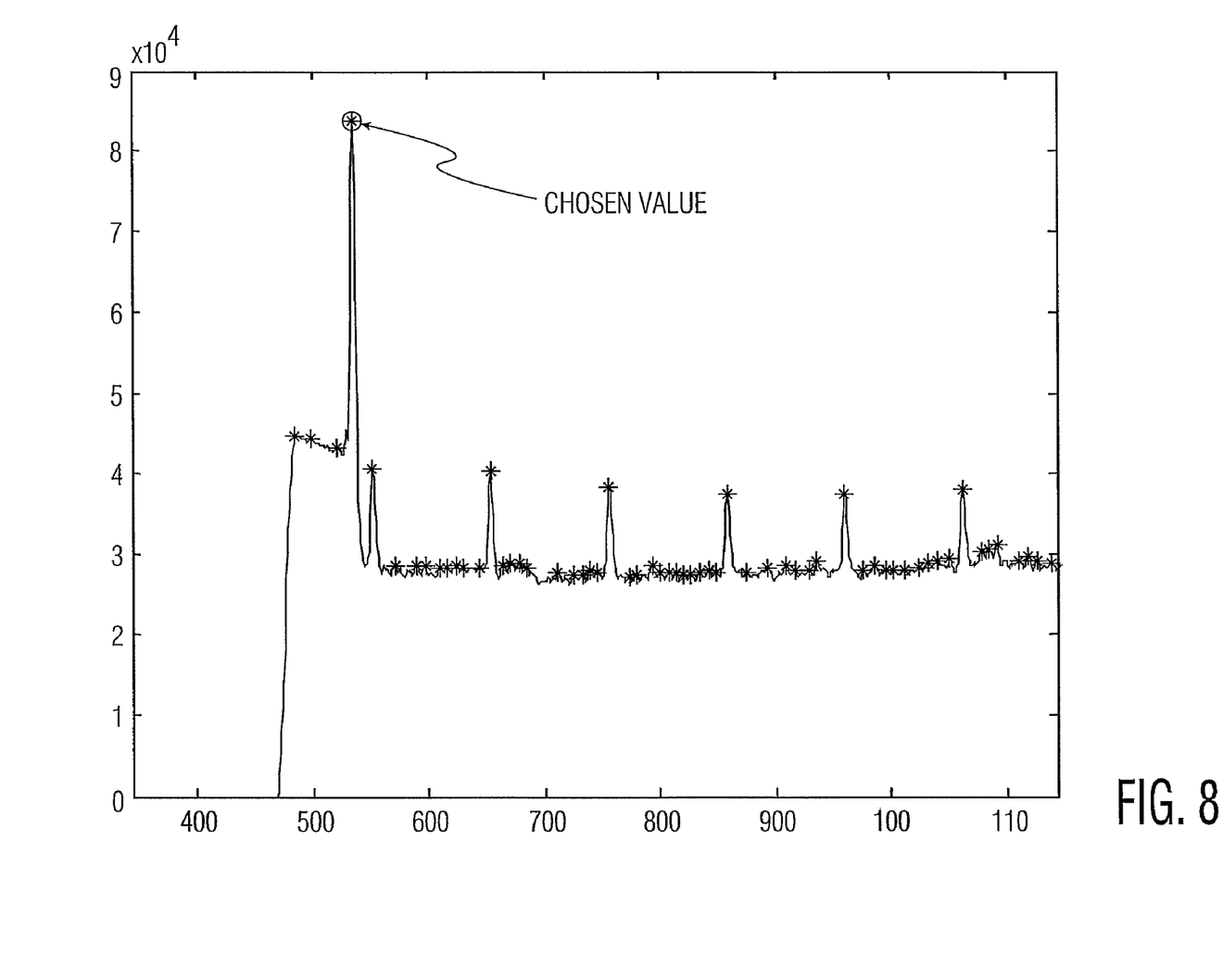
FIG. 8 is a zoom in of the projection from FIG. 7.

We find the first and the last local maxima that are at least 20% of the global maximum. The small circle at the beginning and end in FIG. 7 denote the selected first and last local maxima. Alternatively, if we find a peak which is much higher than the average signal level, we accept that as our first/last local maximum and ignore other peaks around these maxima (FIG. 7). This typically occurs for designs that have fiducial markers all around the probes. The zoom in of the projection and the selected local maxima is shown in FIG. 8. The first and the last columns are estimated by the first and the last local maxima that meet certain criteria. These are necessary to avoid picking noise before the array image actually starts. We only deal with the maxima in the first and the last third of the image in order to do this processing. We pick a subset of local maxima whose local mean gradient is less than 20%. Then we find the first maximum point whose height is at least 25% of the mean intensity in the middle third of the image. This captures typical array edges. Then in case fiducials are present, we test if the maximum value in the first (or last) third is greater than twice the mean of the first (or last) third of the image. If we get such points we designate them as the first and last significant maxima instead of the ones found previously. The small circles at the beginning and end in FIG. 7 denote the selected first and last local maxima. The zoom in of the projection and the selected local maxima is shown in FIG. 8.

Figure 4:
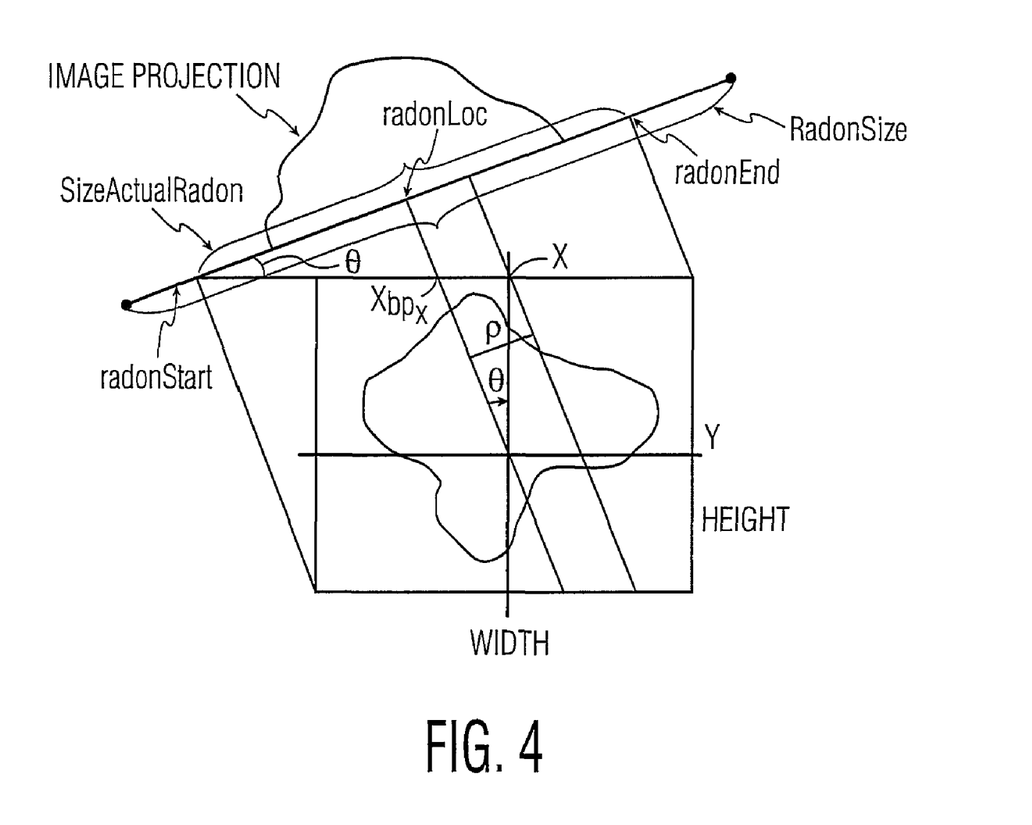
FIG. 4 is Radon space to image space projection.

We back project the corresponding first and last local maxima to the image space to find the first approximation of the lines that would pass through the first and the last columns of the image. At this point, we have lines defined by the angles and the points that we found from back projection. These are the lines that go through the left most and right most columns. The following equation maps the $\rho$ in the Radon space to the image space. The FIG. 4 represents graphically the estimation that needs to be performed.

$$\check{g}(\rho, \theta) = \int_{\infty}^{\infty} \int_{\infty}^{\infty} g(x, y)\delta(\rho - x\cos\theta - y\sin\theta)dx\,dy$$

Each of the Radon transforms has the length Radon Size which is the maximum possible size a Radon transform can be. This is given by the following equation $$\text{RadonSize} = \sqrt{\text{Width}^2 + \text{Height}^2}$$

The Radon transform for all the other angles covers only a portion of the array of RadonSize. This is given by the following equation:

$$\text{sizeActualRadon} = \text{Width}*\cos(\theta) + \text{Height}*\sin(\theta)$$

For each desired point in the Radon transform, its back projection into the image space is given by $$X_{bp} = \begin{cases} \frac{(RadonLoc - radonStart)}{\cos(\theta)} - \text{Height}*\tan(\theta) & \text{if } (\theta > 0) \\ \frac{(RadonLoc - radonStart)}{\cos(\theta)} & \text{otherwise} \end{cases}$$

We need to compute the equation of the line that passes through this point in the image.

$$y = mx + c$$

The slope angle is given by the theta that is selected as having the highest value in a single frequency after performing a fast Fourier transform (FFT). To estimate the value of the constant c in the equation, we have the y=0 for the back projected point of the Radon transform. Therefore, $$c = -m * X_{bp}$$

We next perform steps 2-7 for the rotated image in order to estimate lines that go through top and bottom rows.

In order to find the first approximation of corners we find the intersection of the four lines (top, bottom, left and right). From the above steps, we have the equations of the four lines and we solve the four equations to estimate the four corner points.

Next, we test the fit of the estimated corners. For this purpose, we again use the Radon transform. For the FFT of the Radon transform of the selected theta ($\theta_i$), calculate the ratio ($r_i$) of the global maximum compared to the sum of energy around the global maximum energy frequency itself which is calculated as follows:

$$[\text{maxEnergy } i] = \max(\mathit{fft})$$

$$\text{maxEnergySum} = \text{sum}(\mathit{fft}(i-10{:}i+10))$$

$$r_i = \text{maxEnergySum}/\text{maxEnergy}$$

If this ratio $r_i$ is below a chosen threshold (chosen to be 0.4 heuristically based on a number of experiments and estimating what works well) we trim the image around the first approximation and reapply the Radon transform. The above process is repeated and if even in the second round this ratio is below the chosen threshold, a failure is returned.

We used test images of varying resolution to test our algorithm. Various test images and their resolutions are provided in the Table 1. In many cases the Cy5 and Cy3 were two images bundled in one tiff file. In total fourteen images were tested.

TABLE 1

Test images and their resolution.

| Scan Resolution | Number of Images | Images numbers |
|---|---|---|
| 5 µm | 9 | 1-9 |
| 2 µm | 2 + 2* | 10-11 |
| 1 µm | 1 | 12 |

Table 2 shows the ground truth location of the corners for twelve of the fourteen images referred to in Table 1. The two images denoted as 2* in Table 1 scanned at 2 µm were not considered for the following computation as the algorithm returned a failure. The images are washed out and the algorithm was unable to estimate the angle of rotation well and a failure was declared in step 9 after performing Radon transform on cropped images. The ground truth was estimated manually by looking at the images in MATLAB figure and centering on the top right probe. In case the probe was not present, lines were drawn and the corner point was determined as the intersection of these lines. For image 11, the hybridization of the ROMA chip did not work well and the corners were washed out and could not be estimated manually ("none" is marked in the table). For such cases, having an automated method is invaluable as it is not possible for a human operator to find the corners. The ground truth for image 11 for accuracy computation was taken to be the same as image 10 which was the scan for the Cy3 flourophore.

TABLE 2

Ground Truth location of corners for the twelve images.

| Ground Truth corners | x1 | x2 | x3 | x4 | y1 | y2 | y3 | y4 |
|---|---|---|---|---|---|---|---|---|
| 1 | 105 | 80 | 2690 | 2665 | 50 | 3504 | 64.1 | 3519 |
| 2 | 91.5 | 94 | 2677 | 2679 | 87 | 3541 | 83 | 3536.5 |
| 3 | 91 | 93.5 | 2676.5 | 2679 | 86 | 3540 | 81 | 3534.5 |
| 4 | 70 | 74 | 2655 | 2659.5 | 46 | 3500 | 39.5 | 3493.5 |
| 5 | 70 | 74.5 | 2655 | 2659.5 | 46 | 3500 | 39.5 | 3493 |
| 6 | 86.4 | 89.4 | 2668.7 | 2672.6 | 110.4 | 3563.6 | 104 | 3557.6 |
| 7 | 79.4 | 82.5 | 2664.6 | 2666.6 | 152.3 | 3605.4 | 147.4 | 3601.4 |
| 8 | 58.5 | 61.5 | 2643.5 | 2646.5 | 114 | 3567.5 | 108.5 | 3562 |
| 9 | 73.5 | 75.5 | 2656.5 | 2658.5 | 53.5 | 3506.5 | 51 | 3504.5 |
| 10 | 421 | 398 | 7241 | 7215 | 263 | 8657 | 200 | 8592 |
| 11 | None | None | 7241 | 7216.5 | None | None | 200 | 8593 |
| 12 | 1017.5 | 982 | 14244 | 14206 | 511.5 | 17568 | 377 | 17432 |

Figure 9:
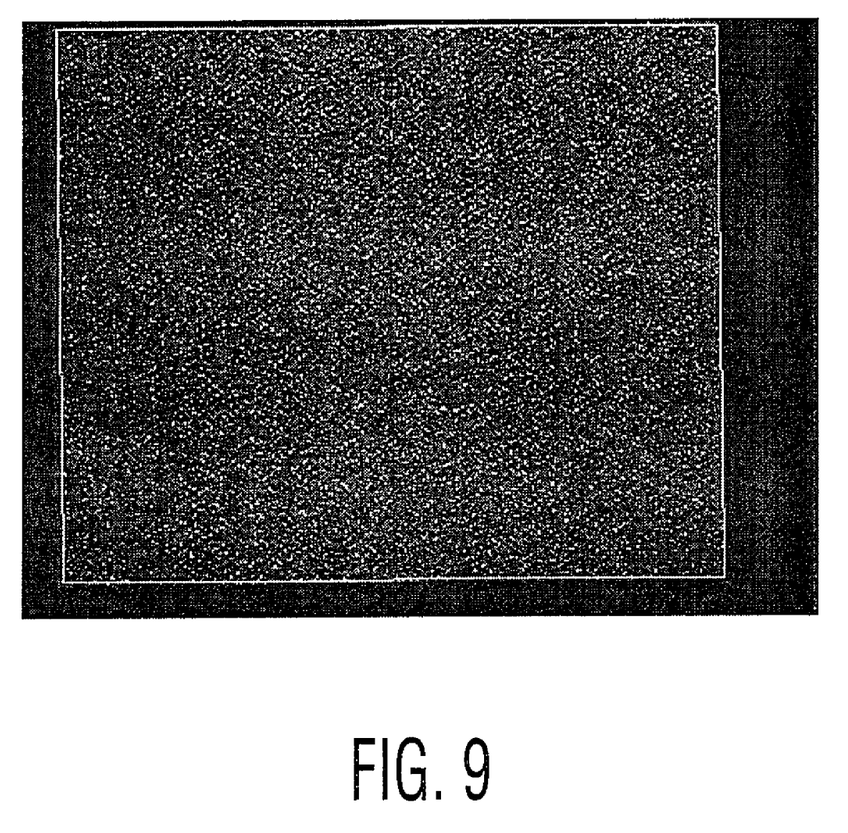
FIG. 9 shows estimated lines in a ROMA image.

Table 3 shows the estimated corners and the total absolute difference (TAD) between the corners estimated values by the algorithm and the ground truth values in Table 2 for each image. For example, for image 1, the TAD in Table 3 is calculated taking the sum of the absolute differences for $x_1$ in Tables 2 and 3 (or 105.3−105=0.3); $x_2$ (or 80−80=0); $x_3$ (2690.3−2690=0.3); $x_4$ (2665−2665=0); $y_1$ (50.4−50=0.4); $y_2$ (3504.4−3504=0.4); $y_3$ (64.6−64.1=0.5); and $y_4$ (3519.5−3519=0.5). Therefore, by adding the absolute differences, TAD is 2.4 for image 1. FIG. 9 shows an example of estimated lines and corners in a ROMA image. This is the visual output of the program where we can see the estimated lines and corners overlaid on an actual ROMA array.

TABLE 3

Estimated location of corners along with the total absolute difference from the ground truth for the corners for the entire image.

| Estimated Corners | x1 | x2 | x3 | x4 | y1 | y2 | y3 | y4 | Total absolute difference (TAD) |
|---|---|---|---|---|---|---|---|---|---|
| 1 | 105.3 | 80 | 2690.3 | 2665 | 50.4 | 3504.4 | 64.6 | 3519.5 | 2.4 |
| 2 | 92.1 | 94.8 | 2677.1 | 2679.8 | 86.6 | 3540.6 | 82.3 | 3536.3 | 4 |
| 3 | 92.1 | 94.8 | 2677.1 | 2679.8 | 85.9 | 3539.9 | 81.1 | 3535.1 | 4.7 |
| 4 | 70.5 | 74.4 | 2656.5 | 2660.4 | 46.1 | 3500.1 | 40.9 | 3494.9 | 6.3 |
| 5 | 70.5 | 74.4 | 2655.5 | 2659.4 | 46.6 | 3499.6 | 40.5 | 3493.5 | 3.7 |
| 6 | 86.4 | 90.6 | 2669.4 | 2673.6 | 111.8 | 3564.8 | 105.2 | 3558.2 | 7.3 |
| 7 | 80.2 | 82.9 | 2665.2 | 2667.9 | 152.9 | 3606.9 | 148.2 | 3602.2 | 6.8 |
| 8 | 59 | 62 | 2644 | 2647 | 113.5 | 3567.5 | 108.5 | 3562.5 | 3 |
| 9 | 74.3 | 76.7 | 2657.3 | 2659.7 | 52.9 | 3505.9 | 51.1 | 3504.1 | 5.7 |
| 10 | 421.3 | 397.9 | 7239.5 | 7216.1 | 265.5 | 8658.1 | 200 | 8592.6 | 7.2 |
| 11 | 421.3 | 397.9 | 7239.5 | 7216.1 | 265.5 | 8658.1 | 200 | 8592.6 | 2.3 |
| 12 | 1010.4 | 992.5 | 14238 | 14220 | 512.9 | 17568 | 377.8 | 17433 | 5.45 |

Table 4 shows the difference per estimated pixel (DPEP) value and also the value as a percentage of the probe size. This is the sum of all the absolute differences in each of the different scan resolutions, divided by the number of images multiplied by eight (we estimated eight values for each image). Each probe is a square of 16 μm. So at 5 μm, there are approximately 3×3 pixels per probe, etc.

DPEP=ΣTAD/(Total number of images*8)

TABLE 4

Absolute difference per estimate value and as a percentage of the probe size.

| Scan Size | Difference per estimated value | Pixels per probe (16 μm wide) | Percentage of the probe size |
|---|---|---|---|
| 5 μm | 0.609722 | 3 × 3 | 20.32407 |
| 2 μm | 0.59375 | 8 × 8 | 7.421875 |
| 1 μm | 1.3625 | 16 × 16 | 8.515625 |

Thus, by using a Radon transform we are able to estimate the corners of a high density ROMA image accurately. In the current dataset the maximum difference is about 20% of the probe size. This just means that in order to find the best fitting grid, the search area around the estimated corner needs to be on the order of a few pixels at the most. This will eliminate the need of a manual intervention in order to find the grid points of the image allowing for high volume deployment of this technology. The method disclosed herein according to the invention shows a lot of promise for automating the entire process of converting the high resolution ROMA images into numbers.

In addition to use with ROMA, it is also contemplated that the disclosed method can be used with different types of arrays including gene expression arrays, single nucleotide polymorphism (SNP) arrays, CpG island arrays, promoter microarrays, protein-DNA interaction arrays and others, including microarrays having "blank" probes on corners, which is very hard to estimate manually. Further, with the help of a fast Fourier transform coupled with the Radon transform, it will be possible to discover the sinusoidal wave that may happen when the scanner is operating in high resolution. Additionally, we believe an extension of our algorithm will possibly double the capacity on microarrays and use all the real estate on the chip and not a checker-board pattern as is used now to allow for probes to be read correctly.

Similar to the method above where the Radon projections are done for straight lines alone, in order to compensate for sinusoidal variation, we can project the image along sinusoids of varying frequencies, at different phases, and at different amplitudes to find the most appropriate sinusoid and the angle of rotation. This method will be able to compensate for the sinusoidal variation and will be able to locate the probes with a better accuracy. A measure to say that such a projection is needed could be to find local minimums for the Radon transformation that is selected and see if the sum of minimums is within a threshold. In case that there is no sinusoidal variation, the minimums will be close to zero. Otherwise, there will be a value that is a bit higher than the background noise that can trigger this sinusoidal variation compensation step to be performed.

In order to estimate the probes, we find the local maximums of the Radon transform for the best angel, frequency, phase, and amplitude and project them back into the imaging space in both the horizontal and vertical directions. The intersections of these lines give the location of the probes.

It is also contemplated that the disclosed method can be used for: 1) processing the image in a subsampled or cropped manner in order to improve the speed of processing—this is going to be important in higher densities or batch processing; 2) processing the decoding into data. One option is to decode the cropped matrix in spatial domain. This can also be done based on the Fourier transform data.

While the present invention has been described with respect to specific embodiments thereof, it will be recognized by those of ordinary skill in the art that many modifications, enhancements, and/or changes can be achieved without departing from the spirit and scope of the invention. Therefore, it is manifestly intended that the invention be limited only by the scope of the claims and equivalents thereof.

The invention claimed is:

1. A method of automatically identifying microarray chip corners and probes in a high density and high resolution microarray scanned image having an image space comprising the steps of:
   (a) applying a Radon transform to an input microarray image to project the image into an angle and distance space where it is possible to find the orientation of the straight lines;
   (b) applying a fast Fourier transform to the projected image of (a) and applying a heuristic to find the optimal tilting angle of the projected image;

(c) applying a heuristic for determining the optimal first and last local maxima for the optimal tilting angle;
(d) back projecting the determined first and last local maxima to the image space to find the first approximation of the first and last column lines of the image;
(e) rotating the image and repeating steps (a) through (d) to find the first approximation of the top and bottom row lines of the image;
(f) determining the first approximation of the four corners of the image from the intersection of the column and row lines;
(g) applying a heuristic for determining if the first approximation of step (f) is accurate; and
(h) if the approximation is not accurate, trimming the scanned image around the first approximation of the four corners and repeating steps (a) through (f).

2. The method of claim 1 wherein the microarray scanned image is an image resulting from a member selected from the group consisting of representational oligonucleotide microarray analysis, gene expression arrays, single nucleotide polymorphism arrays, CgP island arrays, promoter microarrays and protein-DNA interaction arrays.

3. The method of claim 1 wherein the error distortions in the image include keystoning effects.

4. The method of claim 1 wherein the error distortions in the image include sinusoidal or curved probe location lines rather than straight location lines.

5. The method of claim 1 wherein the resolution of the scanned image is 1, 2 or 5 micrometers.

6. The method of claim 1 wherein the scanned image is scanned using Cy3 and Cy5 fluorophores.

7. The method of claim 1 wherein the scanned image results from a chip containing from about 85,000 probes to about 400,000 probes.

8. The method of claim 1 further comprising the step of estimating a location of one or more probes.

9. The method of claim 1 further comprising the step of processing the image in a subsampled or cropped manner.

10. The method of claim 1 further comprising the step of converting the image data into measures of biological activity.

* * * * *